United States Patent
Sun et al.

(10) Patent No.: US 11,633,714 B2
(45) Date of Patent: Apr. 25, 2023

(54) PREPARATION METHOD FOR COMBINED MODIFIED STRAW ACTIVE PARTICULATE CARBON ADSORPTION MATERIAL AND USE OF SAME

(71) Applicant: JIANGSU ACADEMY OF AGRICULTURAL SCIENCES, Jiangsu (CN)

(72) Inventors: Enhui Sun, Jiangsu (CN); Hongying Huang, Jiangsu (CN); Hongmei Jin, Jiangsu (CN); Guofeng Wu, Jiangsu (CN); Zhizhou Chang, Jiangsu (CN); Xiaomei Ye, Jiangsu (CN); Yueding Xu, Jiangsu (CN); Cheng Yong, Jiangsu (CN)

(73) Assignee: JIANGSU ACADEMY OF AGRICULTURAL SCIENCES, Jiangsu (CN)

( * ) Notice: Subject to any disclaimer, the term of this patent is extended or adjusted under 35 U.S.C. 154(b) by 147 days.

(21) Appl. No.: 16/621,621

(22) PCT Filed: Nov. 26, 2018

(86) PCT No.: PCT/CN2018/117520
§ 371 (c)(1),
(2) Date: Dec. 11, 2019

(87) PCT Pub. No.: WO2019/114532
PCT Pub. Date: Jun. 20, 2019

(65) Prior Publication Data
US 2020/0298202 A1    Sep. 24, 2020

(30) Foreign Application Priority Data
Dec. 12, 2017 (CN) .......................... 201711321302.9

(51) Int. Cl.
*C01B 32/318* (2017.01)
*B01J 20/20* (2006.01)
*C05G 3/40* (2020.01)
*B01J 20/12* (2006.01)
*B01J 20/30* (2006.01)
*C02F 1/28* (2023.01)
*C02F 101/10* (2006.01)

(52) U.S. Cl.
CPC .............. *B01J 20/20* (2013.01); *B01J 20/12* (2013.01); *B01J 20/305* (2013.01); *B01J 20/3042* (2013.01); *B01J 20/3078* (2013.01); *B01J 20/3085* (2013.01); *C01B 32/318* (2017.08); *C02F 1/281* (2013.01); *C05G 3/40* (2020.02); *B01J 2220/46* (2013.01); *C02F 2101/105* (2013.01)

(58) Field of Classification Search
CPC .............................. C01B 32/318; B01J 20/20
See application file for complete search history.

(56) References Cited

U.S. PATENT DOCUMENTS

2016/0360745 A1   12/2016   Johnston et al.

FOREIGN PATENT DOCUMENTS

| CN | 105688871 A | 6/2016 |
|----|-------------|--------|
| CN | 106362688 A | 2/2017 |
| CN | 108212080 A | 6/2018 |

OTHER PUBLICATIONS

State Intellectual Property Office of the P.R. China/ISA, International Search Report and Written Opinion for PCT Application No. PCT/CN2018/117520, dated Mar. 4, 2019.
Borgerding, Joseph. "Phosphate Deposits in Digestion Systems." Journal (Water Pollution Control Federation) 44, No. 5 (1972): 813-19. www.jstor.org/stable/25037456.
Feng Yan-Fang, He Shi-Ying, Xue Li-Hong, Chen Yu-Dong, Yang Lin-Zhang, Zhao Jiang-Ning, Yu Ying-Jing. "Adsorption of Phosphorus in Aqueous Solution by Calcined Rare Earth Slag and Its Mechanism." Journal of Ecology and Rural Environment, 2014, 30(5): 627-633.
Li Jin-ye , Zheng Ping. "Applications of Struvite Precipitation in Removal of Phosphorus and Nitrogen from Wastewater" Department of Environment Engineering, Zhe Jiang University. Hangzhou, China. (2004). pp. 7-10.
Yu, Na, "Chemical phosphorus precipitation of wastewater from municipal treatment plant and its environmental effects" Xi'an University of Architecture and Technology , Environmental Science and Engineering, 2015, Master.

*Primary Examiner* — Stuart L Hendrickson
(74) *Attorney, Agent, or Firm* — SoCal IP Law Group LLP; Brian Tamsut

(57) ABSTRACT

A preparation method for a combined modified straw active particulate carbon adsorption material and use of same. The preparation method for the combined modified straw active particulate carbon adsorption material comprises the following steps: 1) mixing straw powders, distilled water, a binder and a composite mineral, then pelletizing same, and then placing same in a tube furnace for pyrolysis to prepare straw particulate carbon; 2) introducing an inert gas into a modification reagent, adjusting the pH value combined and 3) soaking the straw particulate carbon into the combined modification solution for 30 min, and performing cleaning and drying, so as to obtain a combined modified straw active particulate carbon adsorption material. The combined modified straw active particulate carbon has a good adsorption effect on phosphate group in low-pollution water.

Figure 1:
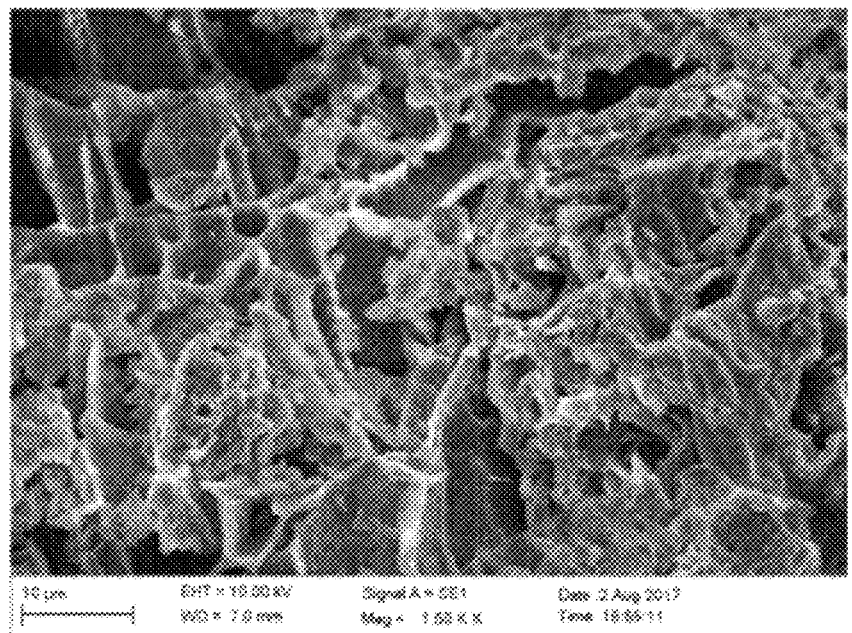

19 Claims, 2 Drawing Sheets

PREPARATION METHOD FOR COMBINED MODIFIED STRAW ACTIVE PARTICULATE CARBON ADSORPTION MATERIAL AND USE OF SAME

I. TECHNICAL FIELD

The present invention belongs to the technical field of agricultural and forestry waste resource recovery and water treatment, in particular to a preparation method of a combined modified straw activated granular carbon adsorption material and use of the same.

II. BACKGROUND ART

The total phosphorus concentration ($\rho_{(TP)}$), total nitrogen concentration ($\rho_{(TN)}$) or $COD_{Cr}$ concentration of pollutants in water bodies such as tail water from wastewater treatment plants, urban surface runoff and farmland drainage is often much higher than the Grade V water quality standard specified in the Environmental Quality Standards for Surface Water, and such water is referred to as "lightly polluted water". Such lightly polluted water is a major cause for lake eutrophication, and the treatment for lightly polluted water has become a major environmental issue in the world. Among various pollution factors causing water body eutrophication, phosphorus is the leading control factor; specifically, the water body can start eutrophication process once $\rho_{(TP)}$>0.02 mg/L. Therefore, how to effectively control phosphorus pollution in lightly polluted water has attracted extensive attention.

The adsorption method for phosphorus removal is efficient and environment-friendly. It utilizes the strong adsorptive effect of porous adsorbents with large specific surface area on phosphate ions in water bodies to attain the purpose of phosphorus removal, and utilizes an adsorption/desorption effect to realize regeneration of adsorbent and recycling of phosphorus resource. Bio-carbon prepared by pyrolysis of crop straws under an anoxic or anaerobic condition at a certain temperature has low bulk density, a large quantity of negative charges on the surface and high charge density, so the bio-carbon has excellent adsorption characteristics. However, the bio-carbon has shortcomings, such as short service life, difficult recovery and serious dust pollution, etc., so the application scope and domain of bio-carbon are restricted.

In addition, the literature (Borgering J. Phosphate deposits in gigestion systems. Water Pollut Control Fed, 1972, 44: 813-819) has disclosed a struvite (MAP) precipitation method, which can remove and recycle phosphorus and nitrogen elements at the same time; moreover, the struvite is a slow-release fertilizer with high fertilizer efficiency in itself, and some companies have tried to recycle the environment friendly struvite fertilizer by adding magnesium salts to waste water with high nitrogen and phosphorus content, and have introduced the struvite to the fertilizer market and attained good environmental and economic benefits (Jinyie Li et al., Application of Struvite Precipitation Method in Phosphorus and Nitrogen Removal from Waste Water [J], China Biogas, 2004, 22 (1): 7-10). Usually, by adding a suitable amount of magnesium source (magnesium chloride, or magnesium hydroxide, etc.) to waste water that contains a large amount of ammonia nitrogen and soluble orthophosphate, the product of the ion concentrations will exceed the solubility product of the struvite, and struvite (the main chemical component is magnesium ammonium phosphate) with a regular rhombic crystal structure will be formed. However, the MAP crystals finally formed through that process may block the pipeline and result in reduction of the effective volume of the digestion tank as time passes.

Previously, the applicant has explored and prepared straw granular carbon with certain compressive strength, large external dimensions and adsorption capacity. The granular carbon can't achieve a high removal rate of phosphate ions in water bodies because a large quantity of negative charges exist on the surface of granular carbon. Therefore, further modification has to be made to the granular carbon to improve the removal of inorganic anions (phosphate ions). Modifying bio-carbon with metal salt ions can effectively improve phosphate ion removal capability of bio-carbon, and the concentration of phosphate in waste water can be decreased by adding calcium salts, iron salts, or aluminum salts to react with phosphate to form precipitates (Na Yu, Study on Chemical Precipitation Characteristics of Phosphorus in Sewage from Municipal Sewage Treatment Plant and Their Influencing Factors, 2015). However, since the co-precipitation method comprises nucleation, growth, Ostward ripening or agglomeration and it is difficult to differentiate and control these processes, control of the morphology and size of the synthesized nano-particles is hard to realize, or the synthesized nano-particles are instable and may be oxidized easily, or the particles may agglomerate easily and have poor dispersion performance, etc. in the late stage. Therefore, if a combined modified straw activated granular carbon that has certain compressive strength and large size while is loaded with highly adsorptive nano-scale iron/aluminum/magnesium oxides can be developed, not only the problem of carbon recovery can be solved, but also the effect of straw activated granular carbon for removing anions (phosphate) in waste water can be improved, and phosphorus resources can be collected.

III. CONTENTS OF THE INVENTION

An object of the present invention is to develop a preparation method of a combined modified straw activated granular carbon adsorption material that is loaded with uniform nano-scale metal oxide on the surface, has large size and is porous. The method effectively solves existing technical problems that modified straw bio-carbon is difficult to recycle, easily produces dregs, and has poor adsorption effect, etc. The modified straw activated granular carbon prepared with the method has outstanding capability of adsorbing and removing phosphate ions in polluted water.

Another technical problem to be solved by the present invention is to provide a preparation method of the above-mentioned combined modified straw activated granular carbon adsorption material and the use thereof.

The object of the present invention is attained with the following technical scheme:

A preparation method of a combined modified straw activated granular carbon adsorption material, comprising the following steps:

1) premixing 100 pbw (parts by weight) straw powder (with a particle size of 40 to 60 mesh), 50~150 pbw distilled water, 10~100 pbw binder, and 0~25 pbw composite mineral in a high-speed mixer for 5~30 minutes, then transferring the materials into a rotary disk-type granulator for granulation with the inclination angle of the rotary disk being 30~60° and rotation speed being 20~60 rpm, to obtain straw composite granules having a particle size of 0.5~6 mm;

2) Loading the obtained straw composite granules into a tubular furnace for pyrolysis, wherein the pyrolysis temperature is 350~750° C., the temperature rise rate is 5~10° C./minute and the pyrolysis time is 1~6 hours, and then cooling, to obtain straw granular carbon with a particle diameter of 0.5~6 mm for later use;

3) Loading a modification reagent at 0.25~0.85 mol/L molar concentration into a three-necked flask, stirring at 150~220 rpm rate for uniform mixing while charging inert gas continuously into the three-necked flask, and then adding an alkaline solution in drops slowly till the pH is 8~11; performing ultrasonic treatment for 5-30 minutes (ultrasonic frequency: 20-60 kHz; ultrasonic power: 100-800 w), and then standing still at 35-60° C. for 30-80 minutes, adding 0.1 mol/L ferric nitrate solution for a reaction lasting for 5-10 minutes, to obtain a combined modified solution for later use;

Wherein the modification reagent comprises at least one of metallic magnesium ion solution, metallic aluminum ion solution, or metallic iron ion solution; the metal ion solution may be a salt solution, such as ferric trichloride solution, polyaluminum chloride solution, and magnesium chloride solution, etc., and the volume ratio of the magnesium salt solution to the aluminum salt solution to the iron salt solution may be any value;

4) Loading the straw granular carbon obtained in the step 2) into the combined modified solution obtained in the step 3) and soaking for 30 minutes, then carrying out ultrasonic treatment for 1~12 h (ultrasonic frequency: 20 kHz~60 kHz; ultrasonic power: 100~800 w) at 1-8 MPa pressure, centrifuging for 10 minutes (rotation speed: 1,000 rpm), and then drying at 105±2° C., and firing in a muffle furnace at 200° C. for 2~8 h, taking out and washing with 0.1 mol/L hydrochloric acid solution and deionized water in alternate till the supernatant is neutral, and then drying the washed carbon at 105±2° C., so as to obtain the combined modified straw activated granular carbon adsorption material.

Furthermore, in the preparation method of the combined modified straw activated granular carbon adsorption material, in the step 1), the binder is at least one of cellulose ether and its derivatives, natural polymer and its derivatives, polyvinyl alcohol, and beta-cyclodextrin; the cellulose ether and its derivatives comprise at least one of methyl cellulose, ethyl cellulose, methyl hydroxyethyl cellulose, hydroxyethyl cellulose, ethyl hydroxyethyl cellulose, carboxymethyl hydroxyethyl cellulose and methyl hydroxypropyl cellulose; the natural polymer and its derivatives comprise at least one of starch, gelatin, sodium alginate, guar gum and Arabic gum.

Furthermore, in the preparation method of the combined modified straw activated granular carbon adsorption material, in the step 1), the composite mineral comprises at least one of nano-montmorillonite and anion powder; the anion powder is composed of tourmaline powder and lanthanide or rare earth elements; wherein, the composite mineral is preferably obtained by mixing the nano-montmorillonite and the anion powder at 1~1.5:1 mass ratio.

Furthermore, in the preparation method of the combined modified straw activated granular carbon adsorption material, in the step 1), the straw powder comprises at least one of wheat straw powder, rice straw powder, corn straw powder, peanut straw powder, cassava straw powder, coconut shell powder and bamboo processing residue powder.

Furthermore, in the preparation method of the combined modified straw activated granular carbon adsorption material, the inert gas in the step 3) is $N_2$ or Ar, and the alkaline solution in the step 3) is 2 mol/L ammonia water or sodium hydroxide solution.

Furthermore, in the preparation method of the combined modified straw activated granular carbon adsorption material, the mass of the ferric nitrate solution added in the step 2) accounts for 10% of the mass of the modification reagent; the mass ratio of the straw granular carbon to the combined modified solution in the step 3) is 1:2~10.

The present invention further provides use of the combined modified straw activated granular carbon adsorption material obtained with the above-mentioned method in the phosphorus adsorption field.

In the present invention, a composite mineral consisting of nano-montmorillonite and anion powder is added. The nano-montmorillonite has a structural formula of $(Al, Mg)_2 [SiO_{10}](OH)_2 \cdot nH_2O$, and is a silicate mineral with a nano-scale lamellar structure in which one aluminum-oxygen octahedron and two silicon-oxygen tetrahedron sublayers are bonded among the sublayers via covalent bonds. After the straw granular carbon is activated by the combined modification solution, the nano-montmorillonite single crystal wafers distributed inside the carbon carrier form a column-layer association structure, and a relatively large space is formed between the associated granules and the adsorption capacity of montmorillonite is improved. Moreover, the ions in the salt balance the negative charges on the silicon-oxygen tetrahedron, the interaction force between the unit layers is relatively weak, and the layers are peelable under the action of the interlayer solvent, so that the specific surface area layer of the nano-montmorillonite increases, further providing adsorption sites for phosphorus removal.

The present invention develops a combined modified straw activated granular carbon, which is modified by magnesium salt/aluminum salt/iron salt/calcium salt and other metal ions, so that the surface layer of the pyrolyzed straw granular carbon is loaded with nano-scale metal oxide particles having uniform size and morphology for efficient phosphorus removal; in addition, the straw granular carbon has unique large specific surface area and abundant porous structures. Therefore, the combined modified straw activated granular carbon can remove phosphorus from lightly polluted waste water, thereby not only reduces the occurrence of eutrophication phenomenon, but also realizes phosphorus recovery. After adsorption in waste water, the combined modified straw activated granular carbon forms a structure similar to the struvite (MAP), and contains abundant magnesium, nitrogen and phosphorus; thus, the recovered straw activated granular carbon becomes an efficient slow-release nitrogen-phosphorus composite fertilizer, and can be used as a substitute to phosphate fertilizer partially.

Compared with the prior art, the present invention attains the following beneficial effects:

1) Straw activated granular carbon, the surface layer of which is loaded with nano-scale metal oxide particles having uniform size and stable morphology, can be synthesized through a combined modification process with multiple metal salt ions, and the straw activated granular carbon can attain an efficient phosphorus removal effect, and especially has high adsorption capacity for phosphate in lightly polluted water bodies; the "lightly polluted water bodies" refers to water bodies in which the total phosphorus concentration ($\rho_{(TP)}$), total nitrogen concentration ($\rho_{(TN)}$) or $COD_{Cr}$ concentration of pollutants is much higher than the Grade V water quality standard specified in the Environmental Quality Standards for Surface Water, such as tail water from wastewater treatment plants, urban surface runoff and farmland drainage, etc.
2) After adsorption in waste water, the combined modified straw activated granular carbon contains abundant magnesium, nitrogen and phosphorus; in addition, the straw carbon has abundant porous structures in itself, and is a good carrier material. Therefore, after adsorption, the straw activated granular carbon is an efficient slow-release composite fertilizer;
3) The combined modified straw activated granular carbon material has stable properties, can effectively absorb nitrogen and phosphorus pollutants on the micro-interface of the carbon material, and thereby eliminates the defect of reduction of the effective volume of the digestion tank incurred by the traditional magnesium salt precipitation method.

IV. DESCRIPTION OF DRAWINGS

Figure 2:
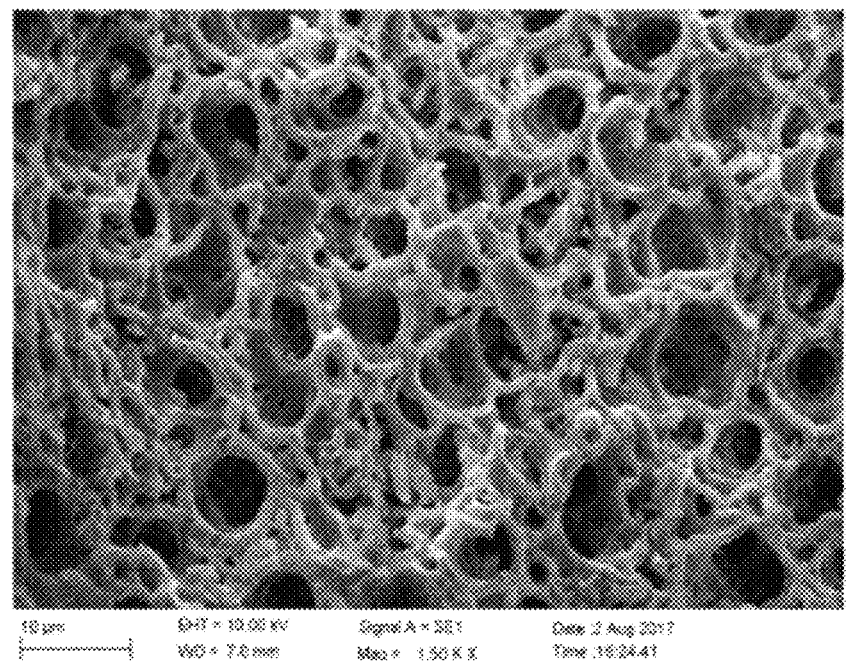
Figure 3:
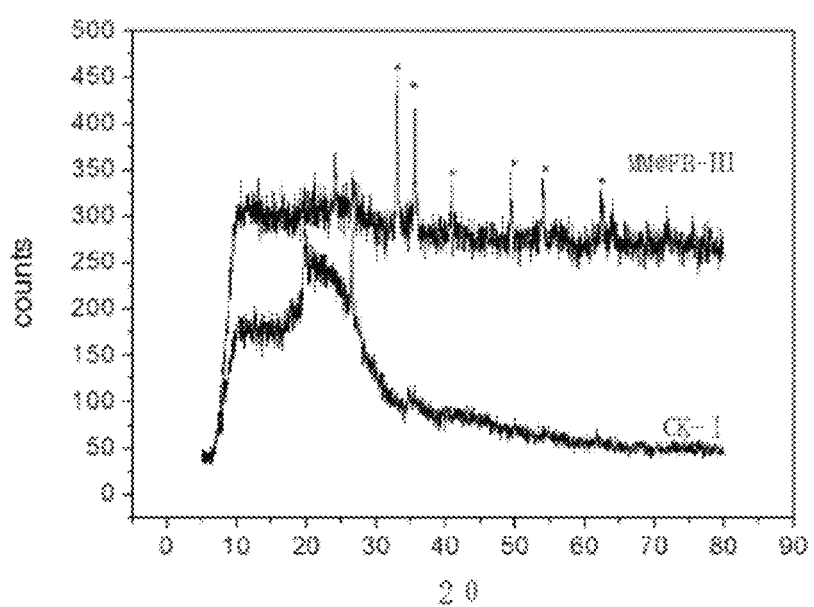

FIG. 1 is a SEM image of the combined modified straw activated granular carbon (MM@FB-III) in example 3;
FIG. 2 is a SEM image of a control group CK-I in example 4;
FIG. 3 shows the XRD spectrum of the combined modified straw activated granular carbon (MM@FB-III) in example 3 and the control group CK-I in example 4.

V. EMBODIMENTS

For easy understanding of the technical means, inventive features, attained object and efficacy of the present invention, hereunder the present invention will be further elaborated in conjunction with the specific examples. It should be understood that the examples described below are only provided to explain the present invention, but don't constitute any limitation to the present invention.

The raw materials and equipment involved in the following examples:

The nano-montmorillonite is purchased from Zhejiang Youpin Biotechnology Co., Ltd.;
The anion powder is purchased from Hebei Hongjun Mineral Products Co., Ltd.;
The tubular furnace (Model TL1200) is purchased from Nanjing Boyuntong Instrument Technology Co., Ltd.;
The Muffle furnace is purchased from Jiangsu Liheng Machinery Co., Ltd.

Example 1. Preparation of a Combined Modified Straw Activated Granular Carbon Adsorption Material A) Preparation of Straw Granular Carbon
1) Straw composite granules: 1,000 g rice straw powder with a particle size of 40~60 mesh, 1,500 g distilled water, 100 g methyl cellulose, 125 g nano-montmorillonite, and 125 g anion powder are premixed in a high-speed mixer for 30 minutes, then the materials are transferred to a rotary disk-type granulator, the inclination angle of the rotary disk is set to 30°, and granulation is carried out at a rotation speed of 20 rpm, to obtain straw composite granules with a particle size of 0.5~6 mm.
2) Preparation of straw granular carbon: the straw granules are loaded into a tubular furnace and pyrolyzed at 350° C. for 6 h, the temperature rise rate being 5° C./minute;

B) Preparation of Combined Modified Straw Activated Granular Carbon
1) 200 mL magnesium chloride solution at 0.85 mol/L molar concentration and 100 mL ferric chloride solution at 0.25 mol/L molar concentration are loaded into a three-necked flask and mixed at 150 rpm stirring rate to a homogeneous state, while nitrogen is charged continuously (in actual implementation, other inert gases such as argon may be charged), then ammonia water solution (or sodium hydroxide solution) with a molar concentration of 2 mol/L is added slowly in drops (within 15 minutes) to adjust the pH to 11 (the purpose of the present invention can be attained as long as the pH is within a range of 8~11), ultrasonic treatment is carried out for 5 minutes, the temperature is controlled at 35° C., and the mixture is kept in a still state for 80 minutes, then 30 mL ferric nitrate solution at 0.1 mol/L molar concentration is added, and the reaction is maintained for 5 minutes, to obtain a combined modified solution;
2) 10 g straw granular carbon is loaded into 100 mL combined modified solution and soaked for 30 minutes, then ultrasonic treatment is carried out at 8 MPa pressure (ultrasonic frequency: 20 kHz-60 kHz; ultrasonic power: 100~800 w) for 1 h, centrifugation is carried out (at 1,000 rpm rotation speed) for 10 minutes, then the mixture is dried at 105±2° C., loaded into a muffle furnace and fired at 200° C. for 8 h, taken out, and washed with 0.1 mol/L hydrochloric acid solution and deionized water in alternate till the supernatant is neutral, then the washed carbon is dried to obtain combined modified straw activated granular carbon (MM@FB-I).

In the actual implementation process, one or more of a cellulose ether and its derivatives (e.g., ethyl cellulose, methyl hydroxyethyl cellulose, hydroxyethyl cellulose, ethyl hydroxyethyl cellulose, carboxymethyl hydroxyethyl cellulose, methyl hydroxypropyl cellulose, etc.) may be compounded as binder; or a natural polymer and its derivatives (e.g., starch, gelatin, sodium alginate, guar gum, or Arabic gum), or polyvinyl alcohol, or beta-cyclodextrin, or their compounds may be used as binder.

In the actual implementation process, at least one of metallic magnesium ion solution, metallic aluminum ion solution, or metallic iron ion solution at 0.25~0.85 mol/L molar concentration may be selected as the modification reagent. At least one of wheat straw powder, rice straw powder, corn straw powder, peanut straw powder, cassava straw powder, coconut shell powder, and bamboo processing residue powder may be selected as the straw powder.

Example 2

A) Preparation of Straw Granular Carbon
1) Straw composite granules: 1,000 g coconut shell powder with a particle size of 40~60 mesh, 500 g distilled water, 800 g methyl cellulose, and 200 g methyl hydroxyethyl cellulose are premixed in a high-speed mixer for 5 minutes, then the materials are transferred to a rotary disk-type granulator, the inclination angle of the rotary disk is set to 60°, and granulation is carried out at 60 rpm rotation speed, to obtain straw composite granules in with a particle size of 0.5~6 mm.
2) Preparation of straw granular carbon: the straw granules are loaded into a tubular furnace and pyrolyzed at 750° C. for 1 h, the temperature rise rate being 10° C./minute;

B) Preparation of Combined Modified Straw Activated Granular Carbon
1) 200 mL magnesium chloride solution at 0.55 mol/L molar concentration, 50 mL ferric chloride solution at 0.45 mol/L molar concentration, and 50 mL aluminum chloride solution at 0.25 mol/L molar concentration are loaded into a three-necked flask and mixed at 220 rpm stirring rate to a homogeneous state, while argon is charged continuously, then sodium hydroxide solution at 2 mol/L molar concentration is added slowly in drops to adjust the pH to 8, ultrasonic treatment is carried out for 30 minutes, the temperature is controlled at 60° C., 30 mL ferric nitrate solution at 0.1 mol/L molar concentration is added after 30 minutes, and the reaction is maintained for 10 minutes, to obtain a combined modified solution;

2) 10 g straw granular carbon is loaded into 20 mL combined modified solution and soaked for 30 minutes, then ultrasonic treatment is carried out at 1 MPa pressure for 12 h, centrifugation is carried out for 10 minutes, then the mixture is dried at (105±2)° C., loaded into a muffle furnace and fired at 200° C. for 2 h, taken out, and washed with 0.1 mol/L hydrochloric acid solution and deionized water in alternate till the supernatant is neutral, then the washed carbon is dried to obtain combined modified straw activated granular carbon (MM@FB-II).

Example 3

A) Preparation of Straw Granular Carbon
1) Straw composite granules: 1,000 g wheat straw powder with a particle size of 40~60 mesh, 800 g distilled water, 400 g methyl cellulose and 600 g methyl hydroxyethyl cellulose, 150 g nano-montmorillonite, and 100 g anion powder are premixed in a high-speed mixer for 15 minutes, then the materials are transferred to a rotary disk-type granulator, the inclination angle of the rotary disk is set to 45°, and granulation is carried out at 40 rpm rotation speed, to obtain straw composite particles with a particle size of 0.5~6 mm.
2) Preparation of straw granular carbon: the straw granular carbon is loaded into a tubular furnace and pyrolyzed at 450° C. for 4 h, the temperature rise rate being 8° C./minute;

B) Preparation of Combined Modified Straw Activated Granular Carbon
1) 200 mL magnesium chloride solution at 0.55 mol/L molar concentration, 50 mL ferric chloride solution at 0.25 mol/L molar concentration, and 50 mL aluminum chloride solution at 0.25 mol/L molar concentration are loaded into a three-necked flask and mixed at 200 rpm stirring rate to a homogeneous state, while nitrogen is charged continuously, then 2 mol/L mixed solution of sodium hydroxide and ammonium water is added slowly in drops to adjust the pH to 10, ultrasonic treatment is carried out for 20 minutes, the temperature is controlled at 45° C., 30 mL ferric nitrate solution at 0.1 mol/L molar concentration is added after 35 minutes, and the reaction is maintained for 10 minutes, to obtain a combined modified solution;
2) 10 g straw granular carbon is loaded into 80 mL combined modified solution and soaked for 30 minutes, then ultrasonic treatment is carried out at 3 MPa pressure for 2 h, centrifugation is carried out for 10 minutes, then the mixture is dried at (105±2)° C., loaded into a muffle furnace and fired at 200° C. for 4 h, taken out, and washed with 0.1 mol/L hydrochloric acid solution and deionized water in alternate till the supernatant is neutral, then the washed carbon is dried to obtain combined modified straw activated granular carbon (MM@FB-III), an SEM image of which is shown in FIG. 1.

Example 4

Control group 1: in the process of the example 3, straw granular carbon without combined modification is used as a control group and denoted as CK-I, and an SEM image of the control group is shown in FIG. 2; control group 2: wheat straw powder is loaded into a tubular furnace and pyrolyzed at 450° C. temperature for 4 h with the temperature rise rate being 8° C./minute, to obtain straw carbon CK-II; control group 3: combined modification is carried out on the basis of the control group 2 to prepare straw carbon which is donated as CK-III, wherein the combined modification method is the same as that in the example 3.

Example 5

1. Adsorption Test of Carbon Material on Phosphate Ions:
Carbon obtained in the examples 1-4 is thrown into simulated waste water containing adsorbate phosphate ions at 100 mg/L initial concentration (see the document: Yan-fang Feng et al., Adsorption Process and Mechanism of Phosphorus in Water Body by Rare Earth Slag Calcined at High Temperature, Journal of Ecology and Rural Environment, 2014, 30 (5): 627-633), and then the mixture is oscillated in shaking table, to study the adsorption capacity of carbon prepared with different methods for phosphate ions. Wherein, the carbon dosage is 3 g/L, the pH is 6.5-7.2, the adsorption temperature is 28° C., the oscillation rate is 180 rpm, and the adsorption time is 4 h. The phosphate removal rate is determined by measuring the simulated waste water before and after adsorption by ammonium molybdate spectrophotometry. It can be seen from the measured data: the adsorption quantity of phosphate ions by MM@FB-III is as high as 31.74 mg/g, and the phosphate removal rate is as high as 95.19%, improved by 8.79 times when compared with CK-III. Therefore, the straw activated granular carbon prepared by combined modification in the present invention has an efficient phosphorus removal effect.

TABLE 1

Phosphorus Removal Effect of Straw Carbon Adsorption Materials Prepared with Different Methods

| Carbon material | Phosphate adsorption quantity mg/g |
|---|---|
| MM@FB-I | 15.46 |
| MM@FB-II | 24.81 |
| MM@FB-III | 31.73 |
| CK-I | 1.52 |
| CK-II | 1.37 |
| CK-III | 3.24 |

It can be seen from the data in Table 1: the combined modified straw activated granular carbon material has greatly improved phosphate adsorption quantity, and the adsorption effect of large-size granular carbon is not weakened when compared with the adsorption effect of powder carbon material.

2. Test of Regeneration and Reuse of Carbon Material for Phosphate Ions:
The combined modified straw activated granular carbon adsorption material MM@FB-III obtained in the test 1 in this example is desorbed and regenerated with sodium hydroxide solution at 0.5 mol/L molar concentration (the carbon adsorption material is immersed in sodium hydroxide solution for desorption), and then is reused. After 5 cycles of desorption and adsorption, the phosphate ion removal rate in the simulated waste water in the test 1 is still as high as 67.5%.

FIG. 1 is a SEM image of the combined modified straw activated granular carbon (MM@FB-III), and FIG. 2 is a SEM image of the control group CK-I. By comparing the images, the internal morphology and surface features of the carbon materials can be seen clearly, wherein, the void structures in the control group carbon material CK-I has an uniform and orderly distribution as well as a regular arrangement. In contrast, the internal void structures of the combined modified straw activated carbon material (FIG. 1) are destroyed and collapsed. As a result, the void structures of the modified carbon are irregular, and most of them present a chaotic and disordered state. Such a structural change provides more active sites for phosphorus removal. FIG. 3 shows the XRD spectrograms of the combined modified straw activated granular carbon in example 3 (MM@FB-III) and the control group CK-I in example 4. It can be seen that the carbon material CK-I has wide and mild amorphous diffraction peaks at 2θ=12°, 24° and 33°, which are mainly peaks 101 and 002 of crystalline carbon fibers and their second-order diffraction peaks. With regard to the combined modified carbon material, the original peaks at 20~26° have disappeared, and many smaller sharp diffraction peaks appear (at 34°, 43°, 52°, 55°, and 65°), which indicate the occurrence of crystalline iron and magnesium oxides, etc.

It can be seen from the example 5: the combined modified straw activated granular carbon adsorption material prepared with the method provided in the present invention can be recycled conveniently and reused time after time. In addition, it is a good carrier material for phosphorus resource recovery, and provides extensive technical support for recycling of adsorption material and reuse of phosphorus resource.

While the principle and implementing methods of the present invention are described in the above specific examples, those examples are only provided to facilitate understanding the method and core idea of the present invention. Those mentioned above are only some preferred embodiments of the present invention. It should be noted that due to limitation of literal expression and as objectively there are infinite specific structures, those having ordinary skills in the art may make various improvements, modifications or variations, and combine the above-mentioned technical features in appropriate ways, without departing from the principle of the present invention; however, those improvements, modifications, variations, or combinations, or direct application of the inventive concept and technical scheme of the present invention to other scenarios without improvement shall be deemed as falling into the scope of protection of the present invention.

The invention claimed is:

1. A preparation method of a combined modified straw activated granular carbon adsorption material for phosphorus removal, comprising the following steps:
  1) mixing 100 pbw straw powder, 50-150 pbw distilled water, 10-100 pbw binder, and 0-25 pbw composite mineral for granulation, to obtain straw composite granules;
  2) Loading the straw composite granules in a tubular furnace and carrying out pyrolysis at 350-750° C. for 1-6h, and then cooling, to obtain straw granular carbon with a particle size of 0.5-6 mm for later use;
  3) Charging an inert gas into a modification reagent, which are at least one of metallic magnesium ion solution, metallic aluminum ion solution, or metallic iron ion solution and adding an alkaline solution in drops till the pH is 8-11; carrying out ultrasonic treatment for 5-30 minutes, keeping in a still state at 35-60° C. for 30-80 minutes, and then adding ferric nitrate solution for reaction for 5-10 minutes, to obtain a combined modified solution for later use;
  4) Loading the straw granular carbon obtained in the step 2) into the combined modified solution obtained in the step 3) and soaking for 30 minutes, carrying out ultrasonic treatment at 1-8 MPa for 1-12h, and then centrifuging; next, drying at 105±2° C., firing in a muffle furnace at 200° C. for 2-8h, taking out and washing with 0.1 mol/L hydrochloric acid solution and deionized water in alternate till the supernatant is neutral, and then drying, so as to obtain the combined modified straw activated granular carbon adsorption material.

2. The method of claim 1 wherein the molar concentration of the modification reagent is 0.25-0.85 mol/L.

3. The preparation method of the combined modified straw activated granular carbon adsorption material according to claim 2, wherein, in the step 1), the composite mineral comprises at least one of nano-montmorillonite and anion powder, the anion powder composed of tourmaline powder and lanthanide or rare earth elements.

4. The preparation method of the combined modified straw activated granular carbon adsorption material according to claim 3, wherein, the molar concentration of the ferric nitrate solution added in the step 3) is 0.1 mol/L, and the mass of the ferric nitrate solution accounts for 10% of the mass of the modification reagent; the mass ratio of the straw granular carbon to the combined modified solution in the step 4) is 1:2-10.

5. The preparation method of the combined modified straw activated granular carbon adsorption material according to claim 4, wherein, in the step 1), the binder is at least one of cellulose ether and its derivatives, natural polymer and its derivatives, polyvinyl alcohol, and beta-cyclodextrin;
  wherein the cellulose ether and its derivatives comprise at least one of methyl cellulose, ethyl cellulose, methyl hydroxyethyl cellulose, hydroxyethyl cellulose, ethyl hydroxyethyl cellulose, carboxymethyl hydroxyethyl cellulose and methyl hydroxypropyl cellulose;
  the natural polymer and its derivatives comprise at least one of starch, gelatin, sodium alginate, guar gum and Arabic gum.

6. The preparation method of the combined modified straw activated granular carbon adsorption material according to claim 5, wherein, in the step 1), the straw powder comprises at least one of wheat straw powder, rice straw powder, corn straw powder, peanut straw powder, cassava straw powder, coconut shell powder and bamboo processing residue powder; the particle size of the straw powder is 40-60 mesh.

7. The preparation method of the combined modified straw activated granular carbon adsorption material according to claim 5, wherein, the mass ratio of the nano-montmorillonite to the anion powder is 1-1.5:1.

8. The preparation method of the combined modified straw activated granular carbon adsorption material according to claim 2, wherein, in the step 1), the straw powder comprises at least one of wheat straw powder, rice straw powder, corn straw powder, peanut straw powder, cassava straw powder, coconut shell powder and bamboo processing residue powder; the particle size of the straw powder is 40-60 mesh.

9. The preparation method of the combined modified straw activated granular carbon adsorption material according to claim 2, wherein, in the step 1), the composite mineral comprises at least one of nano-montmorillonite and anion powder.

10. The preparation method of the combined modified straw activated granular carbon adsorption material according to claim 2, wherein, the inert gas in the step 3) is $N_2$ or Ar, and the alkaline solution in the step 3) is ammonia water or sodium hydroxide solution.

11. The preparation method of the combined modified straw activated granular carbon adsorption material according to claim 3, wherein, in the step 1), the straw powder comprises at least one of wheat straw powder, rice straw powder, corn straw powder, peanut straw powder, cassava straw powder, coconut shell powder and bamboo processing residue powder; the particle size of the straw powder is 40-60 mesh.

12. The preparation method of the combined modified straw activated granular carbon adsorption material according to claim 3, wherein, the mass ratio of the nano-montmorillonite to the anion powder is 1-1.5:1.

13. The preparation method of the combined modified straw activated granular carbon adsorption material according to claim 3, wherein, the inert gas in the step 3) is $N_2$ or Ar, and the alkaline solution in the step 3) is ammonia water or sodium hydroxide solution.

14. The preparation method of the combined modified straw activated granular carbon adsorption material according to claim 4, wherein, in the step 1), the straw powder comprises at least one of wheat straw powder, rice straw powder, corn straw powder, peanut straw powder, cassava straw powder, coconut shell powder and bamboo processing residue powder; the particle size of the straw powder is 40-60 mesh.

15. The preparation method of the combined modified straw activated granular carbon adsorption material according to claim 4, wherein, the mass ratio of the nano-montmorillonite to the anion powder is 1-1.5:1.

16. The preparation method of the combined modified straw activated granular carbon adsorption material according to claim 1, wherein, in the step 1), the straw powder comprises at least one of wheat straw powder, rice straw powder, corn straw powder, peanut straw powder, cassava straw powder, coconut shell powder and bamboo processing residue powder; the particle size of the straw powder is 40-60 mesh.

17. The preparation method of the combined modified straw activated granular carbon adsorption material according to claim 1, wherein, the mass ratio of the nano-montmorillonite to the anion powder is 1-1.5:1.

18. The preparation method of the combined modified straw activated granular carbon adsorption material according to claim 1, wherein, the inert gas in the step 3) is $N_2$ or Ar, and the alkaline solution in the step 3) is ammonia water or sodium hydroxide solution.

19. The preparation method of the combined modified straw activated granular carbon adsorption material according to claim 1, wherein, in the step 1), the temperature rise rate of the tubular furnace is 5-10° C./minute.

* * * * *